May 9, 1939.  E. H. STACKHOUSE  2,157,151
TIRE GROOVING TOOL
Original Filed April 15, 1932
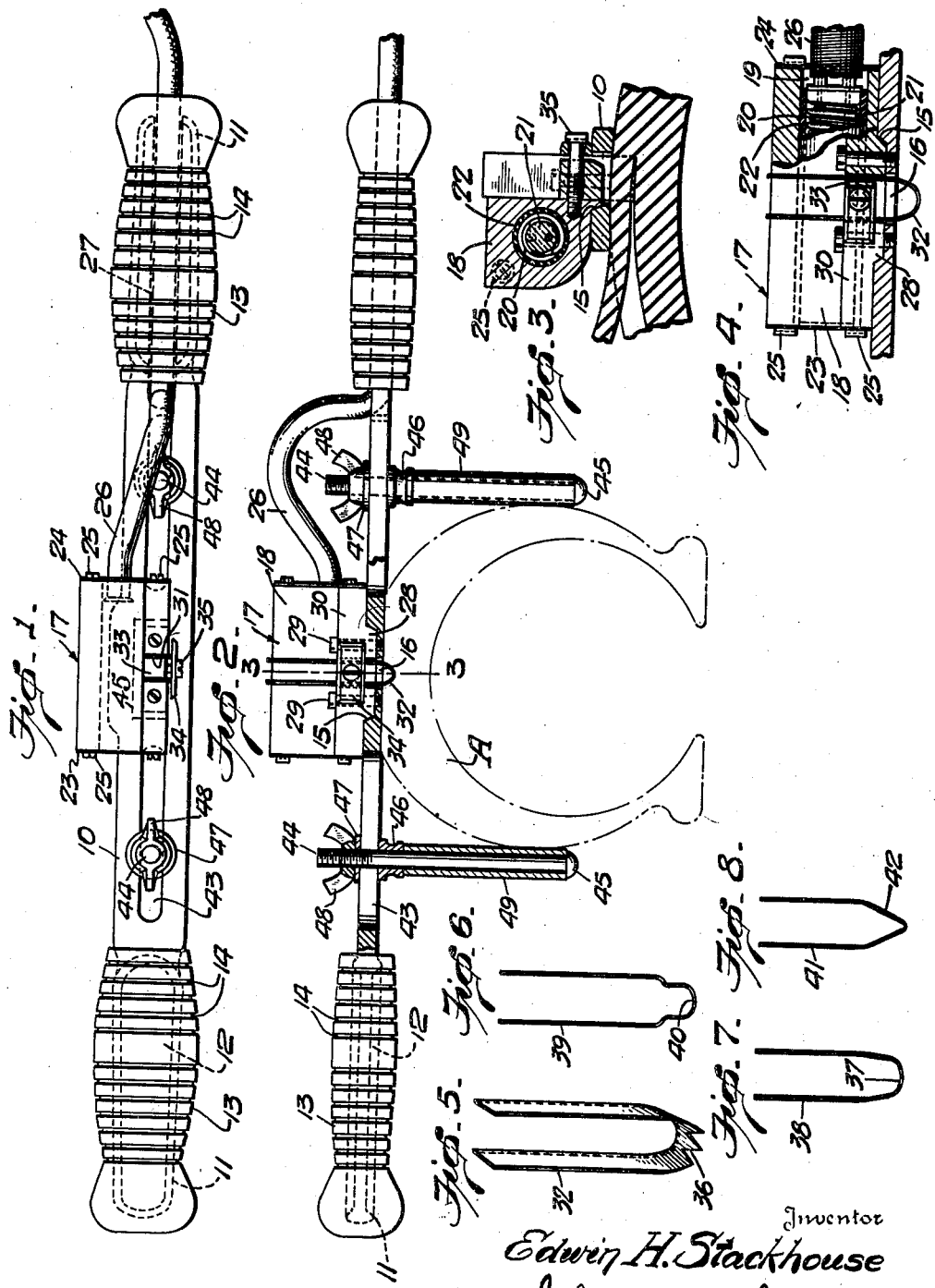

Patented May 9, 1939

2,157,151

UNITED STATES PATENT OFFICE 2,157,151

TIRE GROOVING TOOL

Edwin H. Stackhouse, West Philadelphia, Pa.

Substitute for applications Serial No. 605,542, April 15, 1932, and Serial No. 746,427, October 1, 1934. This application May 20, 1936, Serial No. 80,841

11 Claims. (Cl. 30—140)

This application is a substitution for my previous applications for patent for Tire reconditioning tool, filed April 15th, 1932, Serial No. 605,542, and Tire regrooving tool, filed October 1st, 1934, Serial No. 746,427.

The invention relates to means for grooving and thereby reconditioning the treads of rubber tires of all types, either solid, cushion or pneumatic, after they have worn down and become more or less smooth as the result of service.

I have devised the present invention which has for its general object the provision of a tool by means of which grooves of appropriate width, depth and design or arrangement may be cut in the tread to restore the tire to a safely usable condition.

An important object of the invention is to provide a tool for this purpose which is hand operated and which may be used conveniently without removing the tire from the wheel and which may be employed regardless of whether the tire be inflated or deflated.

Another object is to provide a device of this character which may be adjusted to cut a groove of any desired depth, within reasonable limits, and with which may be used blades of different shapes and sizes depending upon the contemplated cross sectional size and shape of the groove, it being a feature that the tool may be sold commercially with a set of interchangeable blades.

A very important object of the invention is to provide a tire or reconditioning tool embodying electrically operated heating means which will act to soften the rubber of the tread where it is engaged by the actual cutting element and thereby facilitate cutting so that less effort will be required and so that the resultant grooves will probably be smoother.

Another object is to provide a novel means for mounting and fastening the blade in a desired adjusted position, that is to say so that its degree of protrusion may be varied in accordance with the thickness of rubber still remaining on the tread.

Another object is to provide a tool of this character equipped with guide means adapted to bear against the sides of the tire worked upon so that if a circumferential cut is desired it may be made truly and accurately, the guide means being moreover adjustable to correspond to the width of the tire worked upon and to locate the blade at a desired point with respect to the center line of the tread.

An additional object is to provide a tool of this character which will be extremely simple and inexpensive to manufacture, which may be used without any particular training or unusual skill, which will be efficient and durable in service, and a general improvement in the art.

To the attainment of the foregoing and other objects and advantages, the invention preferably consists in the details of construction and the arrangement and combination of parts to be hereinafter more fully described and claimed, and illustrated in the accompanying drawing in which:

Figure 1 is a plan view of a preferred form of the invention,

Figure 2 is a side elevation showing the device engaged upon the tread of a tire shown by dot and dash lines, Figure 3 is a detail cross sectional view taken on the line 3—3 of Figure 2, a portion thereof being illustrated in elevation.

Figure 4 is a fragmentary side elevation with portions broken away and in section to illustrate the heating unit, Figure 5 is a detail perspective view of one form of blade, and Figures 6, 7 and 8 are edge views of modified forms of blades.

Referring more particularly to the drawing I have shown the tool as comprising an elongated bar 10 formed of metal, preferably suitably hardened steel, so that it will have sufficient strength combined with lightness to enable it to be used without excessive effort while rendering it rigid and durable. This tool is intended to be used manually and for this reason the ends of the bar 10 are formed as handles 11 of suitable size and shape to enable them to fit comfortably directly within the hands of the operator if such is desired and, accordingly, it is a feature that the central portions of these handles may be sunk or depressed as shown at 12 so as to provide air passages which will avoid excessive perspiration of the hands of the user and consequent slipping. However, as an additional refinement I have found it particularly advantageous to equip these handles 11 with resilient grips 13, preferably of rubber, which are simply frictionally engaged in place and which may be transversely corrugated, as at 14, or otherwise formed to enable the user to have a good grip and to prevent slipping in case the hands perspire.

At its center the bar is formed with a recess 15 and an opening 16 for a purpose to be described. Mounted on the central portion of the bar is an electric heater which will operate to soften the rubber so that it may be cut with but little effort and greater rapidity than if heating were not resorted to. This heater is designated as a whole by the numeral 17 and is here represented as comprising a metal casing 18 of heavy construction, that is to say with thick walls, so that it will be better capable of retaining and transmitting heat to the cutter to be described. This casing may conveniently be formed as a casting and is provided with a bore or chamber 19 within which is located the heating unit which may be formed as a coil 20 of suitable resistance wire, or its equivalent, supported upon a core 21 preferably of refractory material. A sleeve or shell 22 of insulating material surrounds the coil and prevents the convolutions thereof from short circuiting on the casing. The ends of the bore are closed as by metal plates 23 and 24 held in place by screws 25, the plate 23 being continuous and the plate 24 having an opening through which passes a flexible conduit 26 containing the feed wires for conducting current to the heating unit. This conduit is shown as lying within a slot 27 in one end of the bar and within the confines of one of the rubber grips 13, the grip having a hole in its outer end to permit passage of the conduit.

The bottom of the metallic casing 18 is shown as formed with a projection 28 fitting within the recess 15 at the center of the bar. The heater is mounted in a simple manner as by means of screws 29 which pass through a forward extension 30 on the bottom portion of the casing and into the bar 10 at the bottom of the recess 15 therein. This forward extension 30 is formed at its center with an opening 31 registering with the opening 16 in the bar.

The cutting element 32, which may vary in shape as indicated in Figures 5, 6, 7 and 8 is located within the opening 31 in the extension 30 and projects through the opening 16 so as to be capable of being brought into cutting engagement with the tread of a tire indicated at A by dot and dash lines in Figure 2. The blade is of slightly greater width than the opening 31 so that its edges will project slightly beyond the forward edge of the extension 30. Located between the sides of the blade is a filler block 33 which prevents the sides of the blade or cutter from being sprung toward each other. The blade or cutter is held firmly but adjustably in place by means of a plate 34 which is disposed against the projecting edges thereof and which clampingly engages the blade by virtue of a screw 35 which passes through the plate 34, through the block 33 and into a tapped hole in the casing, as shown. Clearly, upon loosening the screw 35 the blade 32 may be adjusted so as to vary its degree of protrusion beyond the bar 10 so that the depth of the cut or groove may be easily regulated.

The blade 32, illustrated in detail in Figure 5, may have its bight or cutting portion serrated or pronged as shown at 36 though this is not essential, a smooth edge being represented at 37 in the blade 38 shown in Figure 7. Then, too, the entire blade may not be of strictly U-shape, that is to say with its sides straight throughout their length and in Figure 6 I have shown a blade 39 having its bight or cutting portion 40 considerably reduced in width as compared with the remainder of the cutter so that a narrower groove may be cut. Again, a groove U-shaped in cross section may not be desired, in which event use may be made of the blade 41 shown in Figure 8, which blade is disclosed as having its cutting portion 42 of V-shape.

Particularly if it is desired to use the tool for cutting circumferential grooves in a tire tread it is advisable to equip the device with guide means so as to insure accuracy in the direction of the groove or the spacing if several grooves are to be cut. To accomplish this I have shown the bar 10 as formed at opposite sides of its center with longitudinally extending slots 43 through which extend bolts 44 having heads 45 and carrying abutment nuts 46, washers 47 and wing nuts, or the like, 48. As it is intended that these guides bear against the opposite sides of the tire worked upon it is of advantage to provide sleeves or rollers 49 rotatably mounted on the bolts between the heads 45 and the abutment nuts 46 so as to reduce friction. It is intended that these guides be adjusted toward or from each other depending upon the width of the tire to be worked upon and the location of the groove to be cut and it is clear that the nuts 48 provide a very simple means whereby the guides may be secured in adjusted position. It is also to be noted that these guides are of sufficient length that they project beyond the maximum diameter of the tire, considered transversely, as clearly illustrated in Figure 2 so that there will be an accurate guiding action. Of course if a workman becomes sufficiently experienced that he may safely trust to his eye alone then it is conceivable that the guides may be omitted. It is likewise true that the guides will necessarily be omitted when cutting grooves other than circumferential, that is to say either diagonally or transversely of the tire.

The device may be used while the tire is upon a vehicle wheel or mounted in a shop on some suitable support and it is immaterial whether the tire is inflated or deflated as such will have no particular bearing on the action. Assuming that it is desired to cut a series of circumferential grooves in the tire tread, the operator first ascertains the thickness of rubber in the tread and then adjusts the cutter, after loosening the screw 35, so that the cutter will protrude to such an extent that it will cut a groove of the proper depth without exposing the underlying fabric or tire carcass. Furthermore a cutter of appropriate width and shape is selected, U-shape, V-shape or otherwise, depending upon the character of the tire, the number of grooves to be cut and similar considerations. The desired cutter having been fastened in place and adjusted to cut a groove of the proper depth, the operator adjusts the guide bolts 44, with their sleeves 49, to conform to the width of the tire worked upon. If a groove is to be cut in the center of the tread the guides would be set at equal distances from the center, whereas if a groove is to be cut toward the side of the tread, one guide will necessarily be closer to the center than the other. It is believed that this will be easily understood.

The preliminary adjustments having been made, the operator grasps the handles or grips 13 and engages the tool upon the tire with the guides at opposite sides thereof. The bar 10 is then tilted downwardly so that the cutter 32, 38, 39 or 41, as the case may be, will be caused to bite into the rubber and it is preferable that the leading edge of the bar be rounded off somewhat, as shown in Figure 3, so as to facilitate obtaining the initial bite. The operator then flattens out the position of the bar and draws it steadily toward himself and along the circumference of the tire. The rubber within the confines of the cutter or blade will be removed from the tread in the form of a continuous strip. If desired, the groove may be cut uninterruptedly all the way around the tire or it may be withdrawn at intervals so as to leave bridge pieces traversing the circumferential grooves. This of course is merely a matter of choice but it is mentioned as being a possibility. After one circumferential groove is cut the guides should be shifted along the bar so that as many more grooves as desired may be formed. The blade or cutter is intended to be of such design as to be self-sharpening as the result of friction during cutting. Of course, as has been mentioned before, the heater 17 will soften the rubber and greatly facilitate the cutting action.

In some instances it may be desired to cut grooves transversely or diagonally of the tread, particularly in reconditioning tires having treads of the diamond or analogous type. Under such circumstances, the guides are removed and the operator uses the tool by drawing it straight or diagonally across the tire with the cutter located preferably in a position such as to cut continuations or deepenings of the original grooves, though there is no restriction in this respect as the transverse or diagonal cutting or grooving may be done in accordance with any predetermined design.

In actual practice I have found that even a badly worn and comparatively smooth or "bald" tire may, by the judicious use of my tool, be reconditioned and restored to usefulness in a very few minutes, the work being done rapidly and with but little effort. Moreover, unless a tire be very badly worn it can be made to look almost as good as new regardless of whether it be of the pneumatic, solid or cushion type and regardless of its size.

From the foregoing description and a study of the drawing it will be apparent that I have thus provided an extremely simple, inexpensive and easily usable tool for the purpose specified which will be a great economy factor on account of the possibility of prolonging the life of tires which would otherwise be discarded. It is believed that the construction, operation and advantages will be readily apparent to one skilled in the art without further explanation.

While I have shown and described the preferred embodiment of the invention, it should be understood that the disclosure is merely an exemplification of the principles involved as the right is reserved to make all such changes in the details of construction as will widen the field of utility and increase the adaptability of the device provided such changes constitute no departure from the spirit of the invention or the scope of the claims hereunto appended.

Having thus described the invention, I claim:

1. A tire grooving tool comprising an elongated bar having its ends provided with handles, a substantially U-shaped cutting blade associated with the intermediate portion of the bar, and an electric heater mounted on the bar in direct contact with the cutting blade, said blade extending through aligned apertures in said bar and heater.

2. A tire grooving tool comprising an elongated bar having a central recess, an electric heater removably secured upon the bar and having a projection occupying said recess, a substantially U-shaped cutting blade projecting through an aperture in said heater and bar, and means adjustably connecting said cutting blade with the heater and bar.

3. A tool of the character described comprising an elongated bar having an opening intermediate its ends, a heater mounted on the intermediate portion of said bar and having an opening registering with said first named opening, a blade having spaced, substantially parallel sides extending slidably adjustably through said openings and having a cutting edge projecting beyond that side thereof remote from the heater, and means cooperating with said blade and the heater for securing the former in adjusted position.

4. A tool of the character described comprising an elongated bar having an opening intermediate its ends, a heater mounted on the intermediate portion of said bar and having an opening registering with said first named opening, a substantially U-shaped blade extending slidably adjustably through said openings and having a cutting edge projecting beyond the lower face of the bar, and means cooperating with the edges of said blade at the upper face of the bar and with said heater for clamping the blade in slidably adjusted position.

5. A tool of the character described comprising an elongated bar having a transverse opening intermediate its ends, a heater mounted on the intermediate portion of said bar and having an opening registering with said first named opening, a substantially U-shaped blade extending slidably adjustably through said openings and having a cutting edge projecting beyond the lower face of the bar, a member engaging the edges of the blade above the upper face of the bar, and means cooperating with said member and with the heater for securing the blade in slidably adjusted position.

6. A tool of the character described comprising an elongated bar having an opening intermediate its ends, a heater mounted on the intermediate portion of said bar and having an opening registering with said first named opening, a substantially U-shaped blade extending slidably adjustably through said openings and having the edges of its sides projecting beyond the front of the heater, a filler member fitting between the sides of the blade and disposed against the heater, a plate member disposed against the said edges of the blade, and means passing through said plate member and said filler member and into the heater for securing said blade in slidably adjusted position.

7. A tire grooving tool comprising an elongated bar provided at its ends with handles and formed with a central opening and recesses at the sides of said opening, an electric heater secured upon said bar and formed as a metallic casing containing a resistance unit, said casing having an extending portion provided with projections filling said recesses, said extending portion being formed with an opening registering with said first named opening, a substantially U-shaped blade extending through said openings and having a cutting edge projecting beyond the lower side of the bar, said blade being in contacting relation to the heater casing, said blade being slidably adjustable through said openings, and means above the bar for clamping said blade to the heater.

8. A tool of the character described comprising an elongated bar having its ends provided with handles, a substantially U-shaped blade located at the intermediate portion of the bar and projecting beyond one side thereof, said bar being formed at opposite sides of its center with longitudinally extending slots, and guide members carried by the bar and adjustable along said slots, said guide members projecting at right angles from the bar and being engageable against opposite sides of a tire worked upon and having a length sufficient to project inwardly of the tire beyond the portion of maximum diameter.

9. A tire grooving tool comprising an elongated bar having its ends provided with handles, a substantially U-shaped blade located at the intermediate portion of the bar and projecting beyond one side thereof, said bar being formed at opposite sides of its center with longitudinally extending slots, and guide members carried by the bar and adjustable along said slots, said guide members projecting at right angles from the bar and being engageable against opposite sides of a tire worked upon and having a length sufficient to project inwardly of the tire beyond the portion of maximum diameter, said guide members carrying rotatably mounted sleeves adapted to roll against the sides of the tire worked upon.

10. A tire regrooving tool comprising an elongated bar having its ends serving as handles, an electric heater mounted on the bar, a substantially U-shaped cutting blade extending through the bar and having its cutting edge protruding beyond one side thereof, means for clamping the blade to the heater, and flexible grips telescopically engaged upon the handle portions of the bar, said electric heater having a conducting cord lying against one end portion of the bar and extending longitudinally through one of the grips thereon.

11. A tool of the character described comprising an elongated bar provided at its ends with handles and formed at its intermediate portion with a transverse opening and recesses at opposite sides of the opening, a heater disposed upon the bar and having a forwardly extending portion formed with downward projections fitting within said recesses, securing elements passing through the forward extension of the heater at said downwardly projecting portions and engaging within the bar at the bottom of said recesses, said forwardly extending portion of the heater having an opening registering with said opening in the bar, a substantially U-shaped blade extending through said registering openings, and means cooperating with said blade and the forward edge of said forwardly extending portion of the heater for securing said blade in vertically adjusted position.

EDWIN H. STACKHOUSE.